(12) United States Patent  
Gardiner

(10) Patent No.: US 9,933,001 B2  
(45) Date of Patent: Apr. 3, 2018

(54) CLAMP ASSEMBLY

(71) Applicant: Gardiner Pole Systems Limited, Cornwall (GB)

(72) Inventor: Alex Gardiner, Cornwall (GB)

(73) Assignee: Gardiner Pole Systems Limited (GB)

(*) Notice: Subject to any disclaimer, the term of this patent is extended or adjusted under 35 U.S.C. 154(b) by 0 days.

(21) Appl. No.: 13/951,939

(22) Filed: Jul. 26, 2013

(65) Prior Publication Data

US 2014/0294496 A1 Oct. 2, 2014

(30) Foreign Application Priority Data

Mar. 28, 2013 (GB) .................................. 1305790.6

(51) Int. Cl.
*F16B 2/18* (2006.01)
*F16B 7/04* (2006.01)
*F16B 7/14* (2006.01)

(52) U.S. Cl.
CPC ....... *F16B 7/1454* (2013.01); *Y10T 403/7066* (2015.01)

(58) Field of Classification Search
CPC ................ F16B 7/1418; F16B 7/1454; Y10T 403/32426; Y10T 403/32501; Y10T 403/32532; Y10T 403/7062; Y10T 403/7066; Y10T 403/7071; Y10T 24/1441; Y10T 24/1453
USPC ............... 403/109.5, 110, 373, 374.2, 374.5, 403/DIG. 4, DIG. 9; 24/273; 248/229.11, 229.21, 231.21, 231.31, 248/361.1, 316.2
See application file for complete search history.

(56) References Cited

U.S. PATENT DOCUMENTS

| | | | | |
|---|---|---|---|---|
| 2,113,852 | A | * | 4/1938 | Meade .......................... 439/790 |
| 4,429,847 | A | * | 2/1984 | Jablonski et al. ........... 248/74.1 |
| 4,453,446 | A | * | 6/1984 | Hoshino ......................... 84/421 |
| 4,492,005 | A | * | 1/1985 | Begley et al. .................. 24/270 |
| 4,573,717 | A | * | 3/1986 | Peacock ........................ 285/365 |
| 4,657,284 | A | * | 4/1987 | Fiori ............................... 285/39 |
| 4,796,508 | A | * | 1/1989 | Hoshino ......................... 84/421 |
| 5,090,833 | A | * | 2/1992 | Oertle et al. ................... 403/12 |
| 5,295,933 | A | * | 3/1994 | Ciminski et al. ............. 482/107 |
| 5,383,716 | A | * | 1/1995 | Stewart et al. ............ 301/124.2 |

(Continued)

FOREIGN PATENT DOCUMENTS

| | | |
|---|---|---|
| CA | 2428916 A1 | 11/2003 |
| GB | 2171444 A | 8/1986 |

OTHER PUBLICATIONS

Combined Search and Examination Report under Sections 17 and 18(3), GB Application No. 1305790.6, dated Aug. 16, 2013, 6 pages.

(Continued)

*Primary Examiner* — Matthieu F Setliff
(74) *Attorney, Agent, or Firm* — Jason Saunders; Arnold & Saunders, LLP

(57) ABSTRACT

A quick release clamp assembly for use with a pole. The clamp has a clamp body, a connecting member extending between first and second ends of the clamp body, an actuator connected to one end of the connecting member. The other end of the connecting member is connected to one end of the clamp body by a resilient mount. Closing the actuator moves the two ends of the clamp body towards each other, exerting redial force on the pole.

14 Claims, 6 Drawing Sheets

(56) References Cited

U.S. PATENT DOCUMENTS

| | | | |
|---|---|---|---|
| 5,936,197 A * | 8/1999 | Katoh et al. | 174/40 CC |
| 6,305,869 B1 * | 10/2001 | Chen | 403/109.5 |
| 6,581,492 B1 * | 6/2003 | Chen | B62K 3/002 16/900 |
| 6,972,042 B2 * | 12/2005 | Benson | 623/38 |
| 8,783,416 B2 * | 7/2014 | Singleton et al. | 184/3.1 |
| 2002/0007538 A1 | 1/2002 | Bourgerie | |
| 2006/0079965 A1 | 4/2006 | Bensen | |
| 2011/0162173 A1 | 7/2011 | Ciminksi et al. | |
| 2012/0126073 A1 * | 5/2012 | Singleton et al. | 248/201 |

OTHER PUBLICATIONS http://www.windowcleaningmagazine.co.uk/gardiner-smart-clamps/ "Why the latest Gardiner Smart Clamps work so well" Window Cleaning Magazine, Lee Burbidge. 2 pages.

* cited by examiner

CLAMP ASSEMBLY

BACKGROUND OF THE INVENTION

The present invention relates to a clamp assembly for clamping the outer surface of a tubular object, such as a pole. In particular, the clamp assembly of the present invention finds use in clamping the outer surface of one or more poles of a pole assembly.

Pole assemblies comprising a plurality of individual poles attached or connected end to end are known in the art. In general, known pole assemblies may be divided into two categories: telescopic pole assemblies, in which a first pole extends at least partially within a second pole; and modular pole assemblies, in which first and second poles are connected at their ends.

A telescopic pole assembly typically comprises a plurality of poles that may be moved between an extended position and a retracted position. The poles are provided with a range of different nominal diameters. The diameters of the poles are selected such that a given pole may extend partially or wholly within one or more poles of a larger nominal diameter and/or have one or more poles of a smaller nominal diameter extend partially or wholly therewithin. In this way, the plurality of poles may be arranged to move between the retracted and extended positions in a telescopic manner. The poles of the assembly are extended telescopically to form a pole assembly of the required length.

Similarly, modular pole assemblies comprise a plurality of individual poles. However, unlike telescopic pole assemblies, the poles are not nested and extendable in a telescopic manner. Rather, the pole assembly is constructed by connecting individual poles in an end to end configuration. A plurality of poles are connected in this manner until the pole assembly is of the required length.

Both types of pole assembly generally comprise means for locking adjacent or nested poles to achieve the required length. These means include clamps, screw-fitting connections, push-fitting connections and other locking devices. As noted above, the present invention relates to clamp assemblies, more particularly quick release clamp assemblies for attaching poles of a pole assembly, in particular a telescopic pole assembly.

Clamps known in the art and used to secure tubular objects generally function by applying a radially compressive force to the outer surface of the tubular object. Quick release clamps function in the same way, whilst incorporating means for enabling the user to engage and disengage the clamp as quickly and as effortlessly as possible. For example, the clamp may be tightened or released by the movement of a single arm or lever. Various quick release clamping mechanisms are known and are commercially available.

A common clamping mechanism is disclosed in CA 2428916. This patent relates to a quick release assembly for securing a sleeve about a tubular structure where the sleeve has first and second outwardly projecting lugs that may be drawn together toward one another to compress the sleeve. Each one of the lugs has a bore extending therethrough and is positioned on the sleeve such that the bores are generally aligned with one another. The bore on the first lug is internally threaded. The clamping mechanism comprises an elongate bolt member receivable through the bores in the lugs. The bolt member has a first threaded end that threadably engages the threaded bore through the first lug. The clamping mechanism further comprises a tensioning member operable between an engaged and disengaged position. When in its engaged position, the tensioning member bears against the second lug and draws the first lug toward the second lug to compress the sleeve. When in its disengaged position the tensioning member releases the force drawing the first lug toward the second lug. The amount of compressive force applied by the tensioning member is adjustable through threading the first end of the bolt member into or out of the threaded bore in the first lug.

US 2002007538 discloses an alternative quick release clamping mechanism, wherein a hollow cap member is pivotably attached to a base member, both comprising a resiliently deformable block of cushioning material which can be removably inserted. In the open position, the hollow cap member may be selectively pivoted away from the base member. In the closed position, the hollow cap member is pivoted towards the base member and the elongate object is releasably received by and between the base member and the hollow cap member. In the closed position, the resiliently deformable block of cushioning material resiliently embraces and cushions the elongate object. The amount of compressive force applied is fixed and can only be altered by changing the resilient deformable block of cushioning material.

US 2011/0162173 discloses a quick release clamp for a generally cylindrical bar or pipe, comprising a first barrel half and second barrel half. A hinge pin pivotably couples a first edge of the first barrel half with a third edge of the second barrel half. A spring imposes a set force on the barrel halves to bias a second edge of the first barrel half away from a fourth edge of the first barrel half to create a gap, placing the clamp in an open position. A handle includes a base that abuts an outer surface of both barrel halves to compel the second edge of the first barrel half toward the fourth edge of the second barrel half to close the gap, placing the clamp in the closed position. The spring in this case imposes a constant force against the first and second barrel halves.

GB 2171444 relates to a clamp for telescopic tubes, the clamp comprising a spring housing mounted on the outer tube, a resilient member helically wound around the inner tube and secured at one end to a ring rotatably journalled on the housing and a lock means for moving the ring from an unlocked position, wherein the spring is relaxed around the inner tube to a locked position, wherein the spring is caused to grip the inner tube and prevent relative movement between the two tubes.

As highlighted above, a variety of quick release clamp assemblies are known. However, they are all limited in that in the fully closed position, the user is unable to easily increase the amount of compressive force applied to grip poles having a reduced diameter. If any adjustment is possible, the structure of the clamp assembly must first be adjusted or modified manually by the user. For example, in the clamp of CA 2428916, the compressive force applied is adjusted by changing the position of the bolt member. Alternatively, a different clamp assembly or different components, capable of applying additional compressive force to the outer surface of a pole are required.

Pole assemblies offer the advantage of ease of storage, transportation and use. However, in order to provide such advantages, the poles are typically formed using lightweight materials. Such materials allow the pole assembly to be hand held and manipulated by hand. Suitable materials include metals, including aluminium and aluminium alloys, polymers, including fibre-reinforced polymers, in particular polymers reinforced with carbon fibres.

A longstanding problem associated with using light weight materials however is that the poles wear with time.

This is only exacerbated by the use of clamps which, as discussed above, generally function by applying a radially compressive force to the outer surface of the poles. The outer surface of the pole can wear to such an extent that the clamp is no longer able to grip the outer surface sufficiently. In such circumstances, the pole which is worn must either be replaced or an alternative clamp capable of gripping a pole with a smaller outer circumference must be used.

Accordingly, there remains a need for an improved quick release clamp, particularly for use with telescopic pole assemblies, wherein the clamp is able to accommodate changes in the pole outer diameter, for example arising due to wear of the pole.

SUMMARY OF EXAMPLES OF THE INVENTION

The present invention provides a quick release clamp assembly, the quick release clamp assembly comprising;

a clamp body for applying a radially compressive force to the outer surface of a pole, the clamp body comprising a first end portion and a second end portion;

a connecting member extending between the first and second end portions of the clamp body, the connecting member having a first end portion and a second end portion;

an actuator connected to the first end of the connecting member, in use when closing the clamp the actuator moving the second end portion of the clamp body towards the first end portion of the clamp body and relative to the connecting member;

the second end portion of the connecting member being connected to the first end portion of the clamp body by a resilient mount, the resilient mount opposing the action of the actuator when closing the clamp and allowing relative movement between the second end portion of the connecting member and the first end portion of the clamp body.

The present invention provides a quick release clamp assembly. The clamp assembly may be used for clamping a range of tubular bodies or members, including poles and the like. For ease of reference, the clamp of the present invention will be further described with reference to the clamping of a pole. However, the clamp of the present invention is not to be construed as limited in this respect.

The clamp assembly of the present invention comprises a clamp body. The clamp body may be formed from any suitable material or combination of materials. For example, the clamp body may be formed from metal, such as aluminium or alloys thereof. More preferably, the clamp body is formed from high wear resistant materials, including polymers and rubber compounds. More preferably still, the clamp body is formed from a fibre reinforced polymer, in particular glass-fibre reinforced nylon.

The clamp body of the present invention can be of any suitable shape. The clamp body is of a shape which in use, is capable of engaging with the outer surface of a pole and applying a radially compressive force. In use, the clamp body extends around the circumference of the pole. To allow for the clamp assembly to accommodate changes in the outer diameter of the pole being clamped, it is preferred that the clamp body extends around part but not all of the circumference of the pole, such that the first and second end portions, described hereinafter, are spaced apart.

The clamp body comprises a first end portion and a second end portion. In use, the first and second end portions of the clamp body are urged towards each other, thereby applying the compressive force to the outer surface of the pole. The first and second end portions may be of any shape or form. Preferably, the first and second end portions project outwardly from the clamp body. It is preferred that the first and second end portions are formed integrally with the clamp body. However, the first and second end portions may be formed separately from the clamp body and be connected thereto.

In use, the clamp assembly is applied to the outside of a pole to be clamped with the first and second end portions in an open position and separated by a first distance. The clamp assembly is then operated to apply the compressive force, moving the first and second end portions to a closed position, in which they are separated by a second distance, less than the first distance.

As noted above, the clamp assembly further comprises a connecting member which extends between the first and second end portions of the clamp body. The connecting member is preferably an elongate member such as a bolt or screw. In use, the connecting member is free to move relative to the first and second end portions of the clamp body.

At least one of the first and second end portions of the clamp body may comprise a bore therethrough for accommodating the connecting member. In a preferred embodiment, the first and second end portions of the clamp body each comprise a bore extending therethrough. The first and second end portions are positioned such that the bores are generally aligned with one another. The bores can be of any suitable shape or size. The connecting member extends through the bores in the first and second end portions and is able to move within both of the bores relative to the respective end portion.

The connecting member may have a fixed length. Alternatively, the length of the connecting member may be adjustable. Preferably, the length of the connecting member is fixed.

The connecting member comprises a first end portion and a second end portion. The first end portion of the connecting member is adjacent the second end portion of the clamp body and is connected to the actuator, described hereinafter. Any type of suitable fastening means may be used to connect the first end of the connecting member to the actuator. The fastening means is preferably adjustable, in particular to allow the effective length of the connecting member to be adjusted. Adjustment of the effective length of the connecting member varies the distance between the first and second end portions of the clamp body and the amount of compressive force applied by the clamping assembly in operation. Preferably, the first end portion of the connecting member is threaded.

The second end portion of the connecting member is adjacent the first end portion of the clamp body. The movement of the connecting member relative to the first end portion of the clamp body is limited, in particular to limit movement of the connecting member towards the second end portion of the clamp body. Any suitable means may be used to limit or restrict the movement of the connecting member relative to the first end portion of the clamp body. Preferably, the second end portion of the connecting member extends through the bore in the first end portion of the clamp body and comprises a head having a larger diameter than the bore in the first end portion of the clamp body.

More preferably, the head comprises a first head portion and a second head portion. The first head portion is larger in diameter than the bore of the first end portion of the clamp body. The second head portion is smaller in diameter than the first head portion and is able to be accommodated with a portion of the bore which extends through the first end portion of the clamp body.

The second end portion of the connecting member is connected to the first end portion of the clamp body by a resilient mount. In use, the resilient mount opposes the action of the actuator when closing the clamp. In doing so, the resilient mount prevents relative movement between the second end portion of the connecting member and the first end portion of the clamp body. However, should the actuator apply a sufficiently high force to the clamp body, the resilient mount allows relative movement between the second end portion of the connecting member and the first end portion of the clamp body.

The resilient mount preferably comprises a resilient member disposed between the second end portion of the connecting member and the first end portion of the clamp body. In this way, relative movement between the connecting member and the first end portion of the clamp body is possible only by compression of the resilient member. Any suitable resilient member may be employed. In a preferred embodiment, the resilient member is a spring, in particular a coil spring. In a particularly preferred arrangement, the resilient member is located within an enlarged portion of the bore extending through the first end portion of the clamp body, in particular being seated on a shoulder formed therein.

The clamp assembly of the present invention further comprises an actuator. The actuator is connected to the first end portion of the connecting member, as discussed above. In use, the actuator acts between the connecting member and the second end portion of the clamp body to move the connecting member relative to the second end portion of the clamp body and urge the second end portion of the clamp body towards the first end portion of the clamp body.

The actuator may be of any suitable form and employ any suitable mechanism for urging the second end portion of the clamp body towards the first end portion of the clamp body. In a preferred embodiment, the actuator of the present invention comprises an eccentric body, in particular which forms a cam. The eccentric body has an outer surface that bears directly or indirectly on the second end portion of the clamp body. The eccentric body is rotatable on an axis which is normal to the central longitudinal axis of the connecting member. The eccentric body is rotatable about a fastening member attached to the first end portion of the connecting member.

The eccentric body may be formed to have an outer surface which is non-uniform with respect to its central axis of rotation. Alternatively, and more preferably, the eccentric body has an outer surface which is substantially uniform but wherein the axis of rotation of the eccentric body is offset from its centre.

In particular, the outer surface of the eccentric body has a radius from the axis of rotation of the body which ranges between a minimum radius and a maximum radius. Rotation of the eccentric body causes the outer surface bearing on the second end portion of the clamp body to move between those portions of the surface having the minimum and maximum radii. Thus, rotation of the eccentric body about its axis of rotation causes the outer surface bearing against the second end portion of the clamp body to move from that portion of the surface having the minimum radius to that portion having the maximum radius. This action urges the second end portion of the clamp body towards the first end portion thereof, that is into the closed position, and the connecting member towards the second end portion of the clamp body. Reversing the movement of the eccentric body releases the second end portion of the clamp body, which is allowed to return to the open position, for example under an inherent resilience of the clamp body. In the event that the force applied to the second end portion of the clamp body by the outer surface of the eccentric body exceeds the yield force of the resilient mount, the resilient mount yields and allows the connecting member to move towards the second end portion of the clamp body and relative to the first end portion. This prevents further closure of the clamp body and the application of excessive compressive forces on the pole. Rather, the excess compressive force is being accommodated by the resilience of the resilient mount.

The eccentric body may be of any suitable size to apply the required compressive force to the pole. In comparison with known clamps of similar design and applying a corresponding force, the eccentric body of the clamp of the present invention has an outer surface with a maximum radius that is greater than that of the bodies of the known clamps. In this way, the clamp assembly of the present invention may be applied to a wide range of different pole diameters.

The ratio of the minimum radius of the outer surface of the eccentric body to the maximum radius is selected to suit the dimensions of the range of pole sizes to be clamped and the dimensions of the clamp body. Preferably, the ratio between the minimum and maximum radii is from 1:1.5 to 1:3.5. More preferably, the ratio between the minimum and maximum radii is from 1:2 to 1:3. Yet still more preferably, the ratio between the minimum and maximum radii is from 1:2.5 to 1:3.

The form of the actuator, for example the form of the rotatable eccentric body, is selected to allow the clamp assembly to clamp poles of the desired size. As noted above, the excess compressive force that may be applied to larger diameter poles is accommodated by the resilient mount. Accordingly, the resilience of the resilient mount is selected to correspond to the forces applied by the actuator. The resilience of the resilient mount may be indicated in terms of a spring rate. Preferably, the spring rate is in the range of from 100 to 200 N/mm, more preferably from 125 to 180 N/mm, still more preferably from 150 to 175 N/mm.

The eccentric body may be formed from any suitable material or combination of materials, preferably a material resistant to wear. More preferably however, the eccentric body is formed from a combination of glass-fibre reinforced nylon.

Any suitable means for moving the actuator, for example rotating the eccentric body, may be used. In a preferred embodiment, the means for moving the actuator is a lever. In one preferred embodiment, the lever is pivotably attached to a portion of the eccentric body. It is preferred that the lever is formed integrally with the eccentric body. However, the lever may be formed separately from the eccentric body and be connected thereto. In use, movement of the lever causes the actuator to move, for example the eccentric body to rotate and its surface to bear on the second end portion of the clamp body.

The lever may be formed from any suitable material or combination of materials, preferably a material resistant to wear. More preferably however, the lever is formed from a fibre reinforced polymer, for example glass-fibre reinforced nylon.

As discussed above, the eccentric body of the actuator is preferably larger than in conventional quick release clamp assemblies. This enables the user to apply compressive forces to a wider range of pole diameters. However, as a consequence, the second end portion of the clamp body may be subjected to increased wear. More generally, it has been found that in clamps of this arrangement, both of this invention and similar clamp assemblies of the prior art, wear of the second end portion by the actuator can be significant, leading to a shortening of the workable lifetime of the assembly.

Accordingly, in a second aspect, the present invention provides a quick release clamp assembly, the quick release clamp assembly comprising;

a clamp body for applying a radially compressive force to the outer surface of a pole, the clamp body comprising a first end portion and a second end portion;

a connecting member extending between the first and second end portions of the clamp body, the connecting member having a first end portion and a second end portion;

an actuator connected to the first end portion of the connecting member, in use when closing the clamp the actuator moving the second end portion of the clamp body towards the first end portion of the clamp body and relative to the connecting member, the actuator applying force to a surface of the second end portion of the clamp body; and a shim disposed between the surface of the second end of the clamp body and the actuator.

In this aspect of the present invention, the actuator applies a force to the second end portion of the clamp body indirectly by way of the shim. The shim receives the force of the actuator and it is the shim that is subject to wear. The shim may be replaced when worn, avoiding the need to replace the entire clamp assembly.

In the preferred embodiment discussed above, the actuator comprises an eccentric body rotated about an axis. The outer surface of the eccentric body of the actuator bears indirectly on the second end portion of the clamp body. In particular, the outer surface of the eccentric body of the actuator bears against the shim, disposed between the eccentric body and the second end portion of the clamp body. The shim is replaceable and acts to protect the second end portion of the clamp from any wear.

The shim may be formed from any suitable material or combination of materials. Preferably, the shim is made from a material having a low coefficient of friction. Suitable materials include polymers and rubber compounds. It is preferred that the shim is formed from a material that is less hard than the material of the actuator, such that any wear occurring arises in the shim. In a particularly preferred embodiment, the shim is made from a homopolymer acetal resin, also known under the trade name DELRIN™.

The shim may be of any suitable shape. Preferably, the shim is shaped so as to compliment the outer surface of the actuator which bears against it. In addition, the shim is preferably shaped so as to compliment the relevant portion of the outer surface of the second end portion of the clamp body. In one embodiment, the shim has a generally crescent-shaped cross-section.

In a further aspect, the present invention provides a shim for use in a quick release clamp assembly as described hereinbefore.

DESCRIPTION OF THE DRAWINGS

Embodiments of the present invention will now be described, by way of example only, having reference to the accompanying drawings, in which.

DETAILED DESCRIPTION OF EXAMPLES OF THE INVENTION

Figure 1:
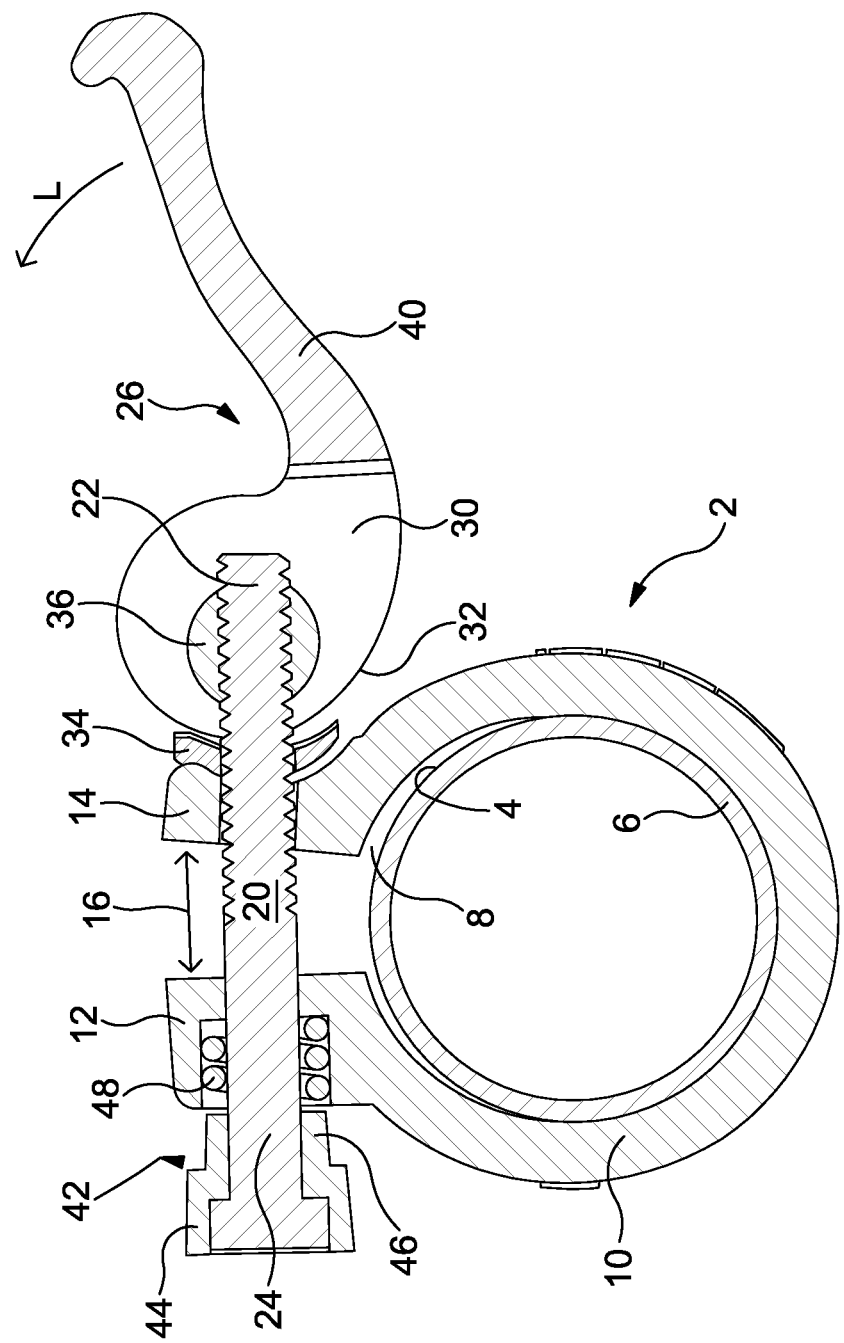
FIG. 1 is a cross sectional view of a clamp assembly according to a preferred embodiment of the present invention in the open position.

With reference to FIG. 1, there is shown a quick release clamp assembly according to one embodiment of the present invention, generally indicated as 2. In this Figure the clamp assembly 2 is shown in the open position.

In the open position, the clamp assembly 2 fits loosely around the outer surface 4 of an inner pole 6, typically leaving a space 8 between the clamp assembly 2 and the outer surface 4 of the inner pole 6. In use, the clamp assembly 2 may be adjusted to move between the open position and a closed position, described in more detail below with reference to FIG. 2, in which the clamp assembly is secured by clamping to the inner pole 6. It will be appreciated that the pole 6 may be replaced by any generally cylindrical body that is required to be clamped.

Figure 6:
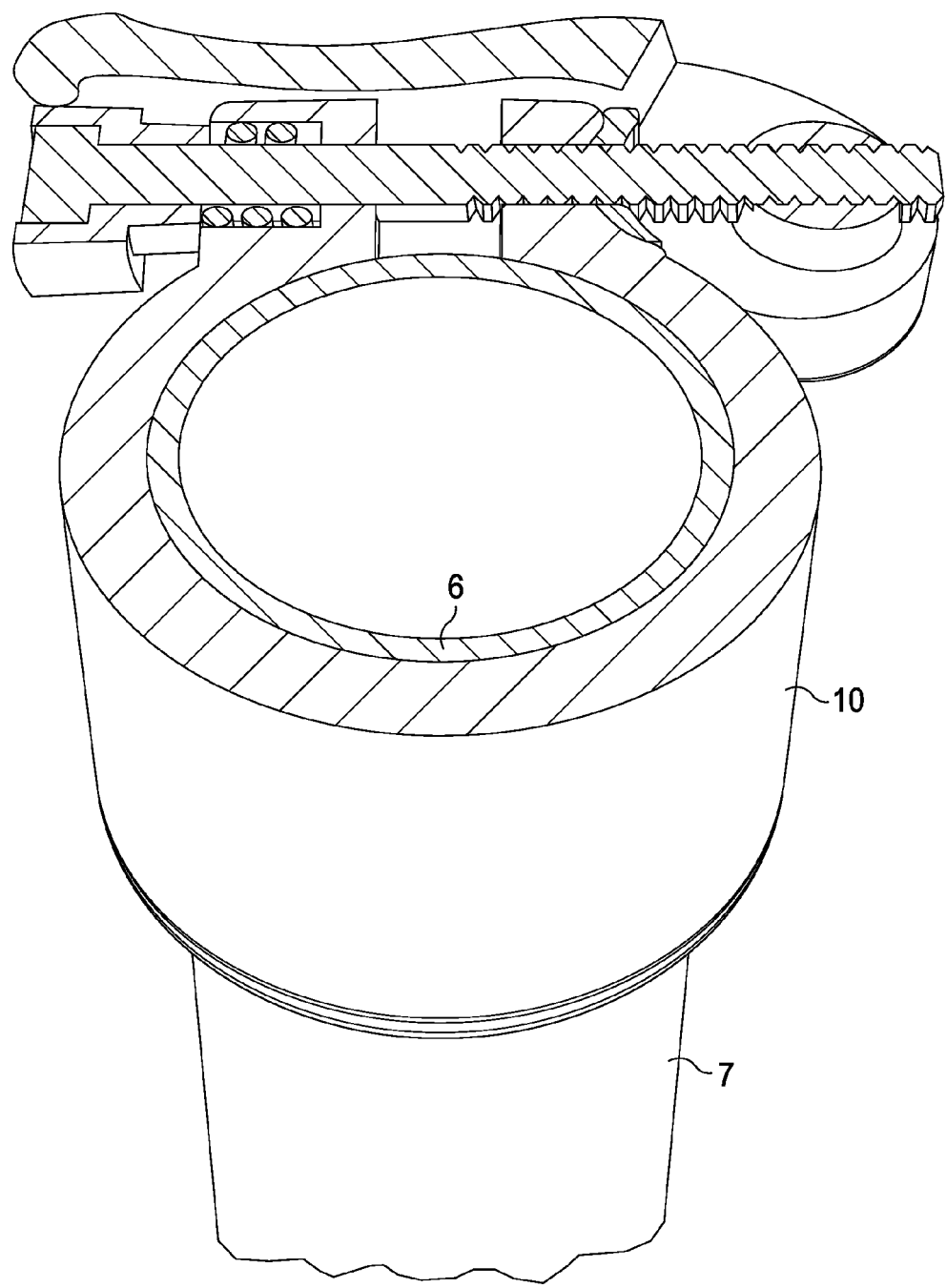
FIG. 6 is a perspective cross sectional view of the clamp assembly of FIG. 1 in the closed position.

The clamp assembly 2 comprises a clamp body 10 formed from glass-fibre reinforced nylon. As shown in FIG. 1, the clamp body 10 is generally circular and ring-like in shape, so as to enable it to contact and engage with the outer surface 4 of the pole 6 and apply a radially compressive force thereto. The clamp body 10 is affixed to a first end of outer pole 7 (see FIGS. 3 and 6). Outer pole 7 is not shown in FIGS. 1, 2, and 4 because it is not in the cross section illustrated.

To allow for the clamp assembly 2 to be closed about and clamped to the pole 6, the clamp body 10 extends around part but not all of the outer surface 4 of the pole 6. The clamp body 10 comprises a first end portion 12 and a second end portion 14 separated in the open position shown in FIG. 1 by a first distance 16.

As shown in FIG. 1, the first end portion 12 and second end portion 14 project outwardly from the clamp body 10 and oppose each other. Further, as shown in more detail in FIG. 2, the first end portion 12 and second end portion 14 each comprise a bore 18a, 18b extending therethrough and are positioned such that the bores 18a, 18b are generally aligned with one another.

The clamp assembly 2 further comprises a connecting member in the form of a bolt 20. The bolt 20 extends between and through the bores 18a, 18b of the first end portion 12 and second end portion 14 of the clamp body 10 and is free to move therethrough relative to the first and second end portions. The bolt 20 comprises a first end portion 22 and a second end portion 24. The first end portion 22 of the bolt 20 is adjacent the second end portion 14 of the clamp body 10 and is connected to the actuator 26, described hereinafter. The first end portion 22 of the bolt 20 is threaded. In this way, the effective length of the bolt 20 is able to be adjusted, as described below. The effective length of the bolt 20 is the distance between the head portion 46 and the outer surface 32 of the actuator, described below. Adjustment of the effective length of the bolt 20 varies the distance between the first end portion 12 and second end portion 14 of the clamp body 10 and the amount of compressive force applied by the clamping assembly 2 in operation.

Figure 2:
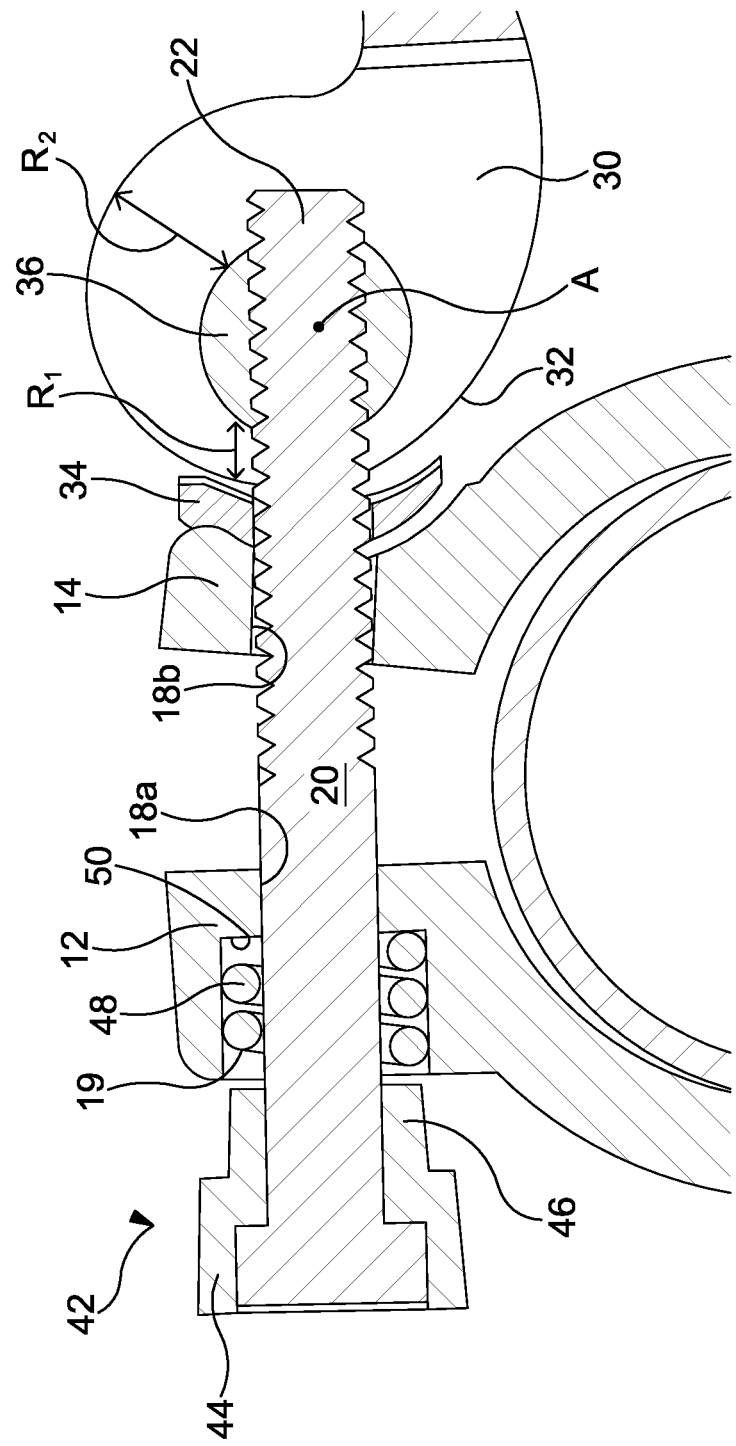
FIG. 2 is an enlarged cross sectional view of a portion of the clamp assembly of FIG. 1.

As noted above, the clamp assembly 2 further comprises an actuator, generally indicated as 26, formed from glass-fibre reinforced nylon. The actuator 26 comprises an eccentric body in the form of a cam 30. The cam 30 has an outer surface 32 which bears on the second end portion 14 of the clamp body 10. In FIGS. 1 and 2, the outer surface 32 of the cam 30 is shown to bear indirectly on the second end portion 14 of the clamp body 10, by way of a protective shim 34, discussed in more detail below, with reference to FIG. 5. However, it is to be appreciated that the outer surface 32 of the cam 30 can bear directly on the second end portion 14 of the clamp body 10. In this arrangement however, the clamp assembly is more prone to wear.

As shown in more detail in FIG. 2, the cam 30 has an axis of rotation A which is offset from its centre and has an outer surface 32 that is eccentric with respect to the axis of rotation A. The cam 30 is rotatable about the axis A, which is normal to the central longitudinal axis of the bolt 20. The cam 30 is provided with a generally cylindrical fastening member 36 arranged uniformly about the axis of rotation and about which the cam 30 rotates. The fastening member 36 threadably receives the first end portion 22 of the bolt 20. The effective length of the bolt 20 is adjusted by rotating the bolt relative to the fastening member 36.

As shown in more detail in FIG. 2, the outer surface 32 of the cam 30 has a radius from the axis of rotation A which ranges between a first, lower radius $R_1$ and a second, larger radius $R_2$. The ratio of the first radius $R_1$ of the outer surface 32 of the cam 30 to the second radius $R_2$ is selected to suit the dimensions of the range of pole sizes to be clamped and the dimensions of the clamp body 10. The ratio of the second radius $R_2$ to the first radius $R_1$ shown in FIG. 1 is 2.76:1. In the fully open position, the outer surface 32 of the cam 30 with the first radius $R_1$ bears on the second end portion 14 of the clamp body 10.

It is a feature of the clamp assembly of the present invention that the ratio of the second radius $R_2$ to the first radius $R_1$ may be significantly greater than similar clamps of known design. This allows the clamp assembly of the present invention to be applied to a greater range of pole sizes, for example allowing the assembly to accommodate wear in the pole as a result of use.

The actuator 26 further comprises a lever 40, which is attached to and extends outwards from the cam 30. Movement of the lever 40 rotates the cam 30 and moves the clamp assembly 2 between the open and closed positions.

The second end portion 24 of the bolt 20 is adjacent the first end portion 12 of the clamp body 10. The second end portion 24 of the bolt 20 extends through the bore 18a in the first end portion 12 of the clamp body 10 and comprises a head 42. The head 42 comprises a first head portion 44 and a second head portion 46. The first head portion 44 is disposed at the end of the head 42 and is larger in diameter than the bore 18 of the first end portion 12 of the clamp body 10. The second head portion 46 is smaller in diameter than the first head portion 44 and is able to be accommodated within a flared portion 19 of the bore 18a which extends through the first end portion 12 of the clamp body 10.

The second end portion 24 of the bolt 20 is spaced from the first end portion 12 of the clamp body 10 by a resilient mount in the form of a coiled spring 48 located in the flared portion 19 of the bore 18a. The coiled spring 48 limits relative movement between the second end portion 24 of the bolt 20 and the first end portion 12 of the clamp body 10. In this way, relative movement between the connecting member 18 and the first end portion 12 of the clamp body 10, in particular movement of the head 42 towards the first end portion 12 is possible only by compression of the coiled spring 48.

As shown in more detail in FIG. 2, the coiled spring 48 is located within the flared portion 19 of the bore 18a extending through the first end portion 12 of the clamp body 10, being seated on a shoulder 50 formed therein.

The dimensions and properties of the coiled spring 48 are selected to correspond to the size of the actuator 26 and the forces applied thereby, in turn determined by the intended use of the clamp. An exemplary coiled spring 48 has the following characteristics:

| Material | Stainless Steel |
|---|---|
| Spring Constant (Spring Rate) | 163.838 N/mm |
| Load Force | 1:25 N at 6.874 loaded height |
| Wire Diameter | 1.6 mm |
| Outside Diameter | 8.6 mm |
| Free length | 7.00 mm |
| Closed length | 4.8 mm |
| No. of active coils | 1 |
| No of total coils | 3 |
| Type of ends | Closed & Ground |
| Spring index C | 4.375 |

Figure 3:
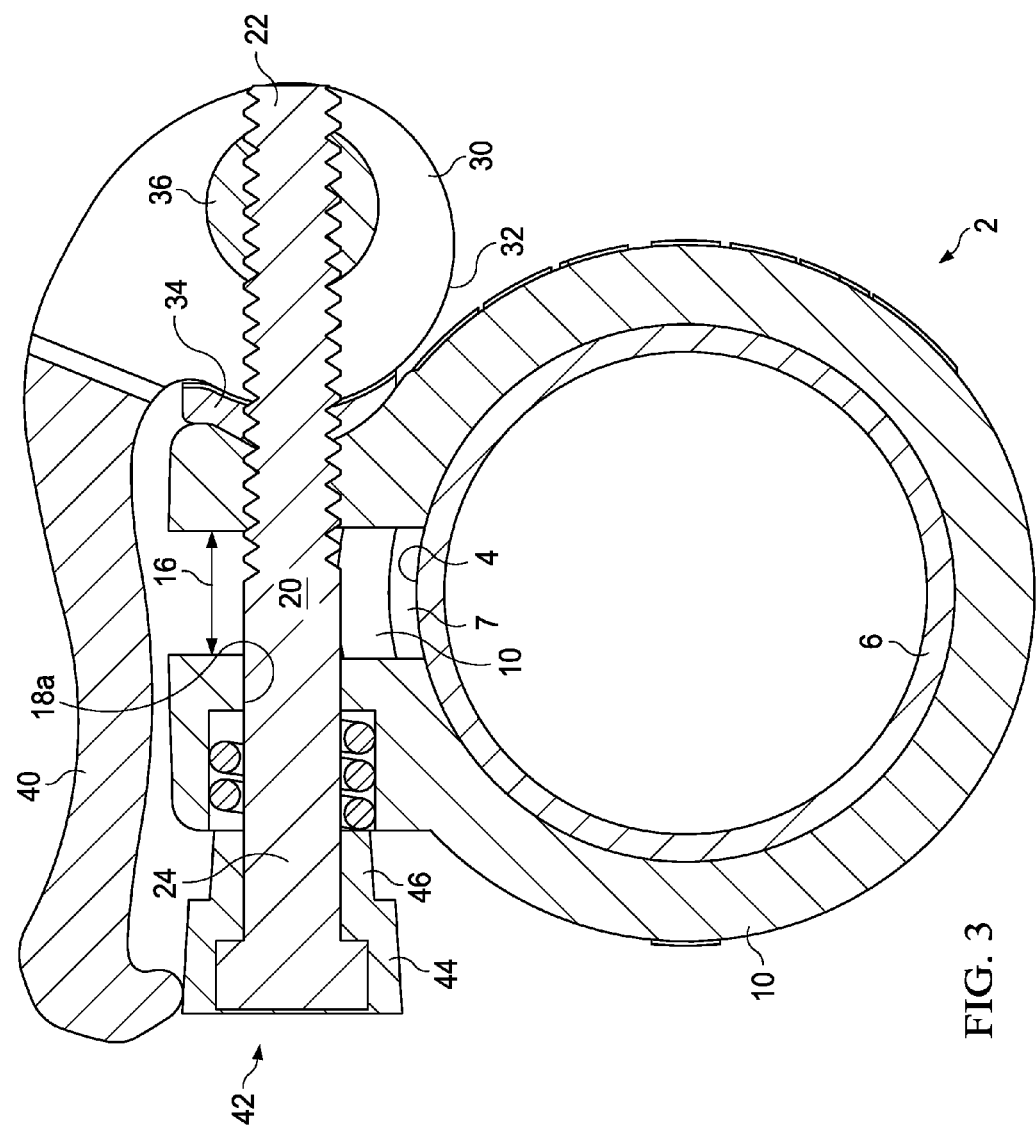
FIG. 3 is a cross sectional top view of the clamp assembly of FIG. 1 in the closed position.

FIG. 3 shows the quick release clamp assembly of FIG. 1 in the closed position. In both FIGS. 1 and 3, the dimensions of the outer surface 4 of the pole 6 to be clamped are the same.

As noted above in relation to FIGS. 1 and 2, in use, the clamp assembly 2 is applied to the outer surface 4 of a pole 6 in the open position with the first end portion 12 and second end portion 14 separated by the first distance 16. The clamp assembly 2 is then operated by rotating the lever 40 in the direction of arrow L in FIG. 1, in turn rotating the cam 30, to bring the portion with the second radius $R_2$ to bear on the second end portion 14, urging the first end portion 12 and second end portion 14 towards each other and into the closed position. In the closed position, the first and second end portions 12, 14 of the clamp body 10 are separated by a second distance 16', less than the first distance 16.

As shown in FIG. 3, in the fully closed position, the head portion 42 of the bolt 20 does not extend within the bore 18a in the first end portion 12 of the clamp body 10.

Figure 4:
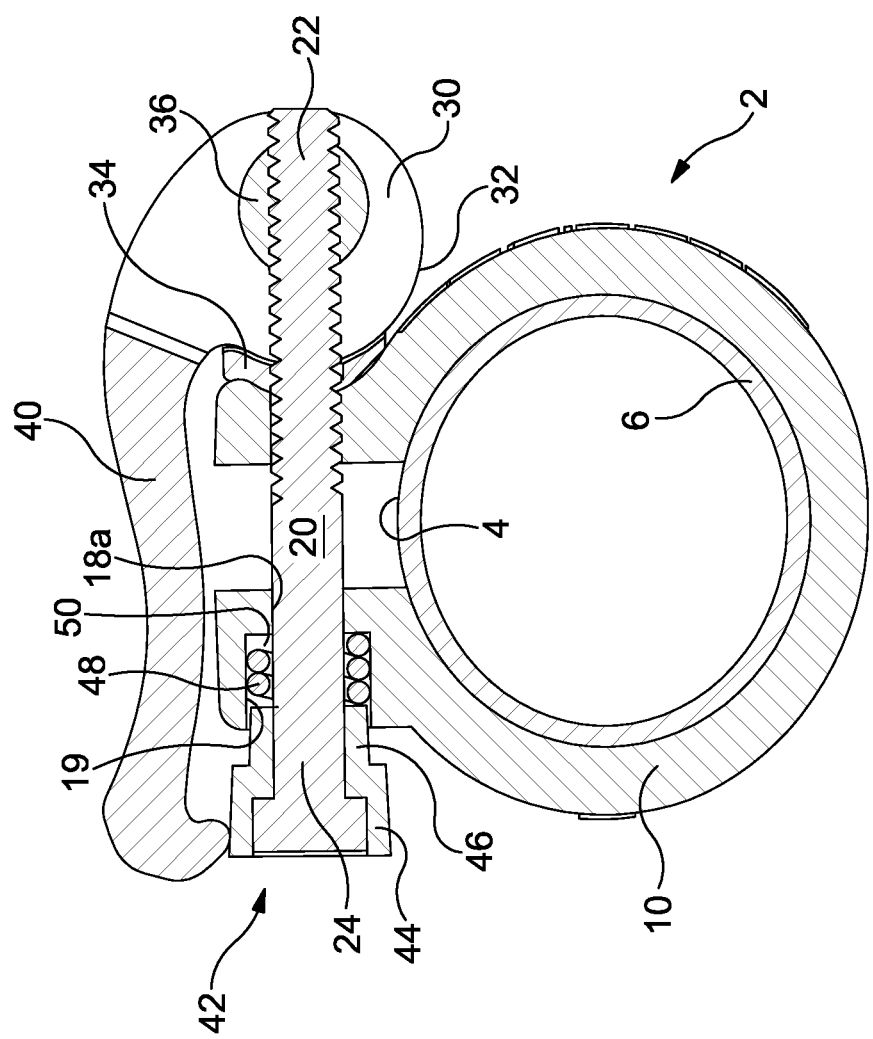
FIG. 4 is a cross sectional view of the clamp assembly of FIG. 1 in the closed position, wherein the pole is of a larger outer diameter than in FIGS. 1 and 3.

With reference to FIG. 4 there is shown the clamp assembly 2 in the closed position around a pole of larger outer diameter than in FIGS. 1 and 3.

As discussed above, the clamp assembly 2 of the present invention is capable of clamping poles of reduced diameters, particularly due to wearing of the pole through use. This is achieved by employing a cam 30 having a second radius $R_2$ which is greater than that of the bodies of the known clamps. In this way the maximum amount of compressive force that can be applied is increased enabling the clamp assembly to grip poles having smaller outer diameters.

Notwithstanding the larger cam 30, the clamp assembly 2 of the present invention is capable of accommodating poles having larger outer diameters, without requiring manual adjustment. This is in contrast to known clamps of similar design.

As noted above, the clamp assembly 2 comprises a coiled spring 48 disposed between the head 42 of the bolt 20 and the first end portion 12 of the clamp body 10. As shown, the coiled spring 48 is located within the flared portion 19 of the bore 18a extending through the first end portion 12 of the clamp body 10, being seated on the shoulder 50 formed therein. The properties of the coiled spring 48, in particular its resilience, are selected to correspond to the size of pole to be clamped, the dimensions of the actuator 26 and the forces to be applied thereby.

In the event that the force applied to the second end portion 14 of the clamp body 10 by the outer surface 32 of the cam 30 exceeds the yield force of the coiled spring 48, such as when the clamp assembly is applied to a pole of larger diameter, as in FIG. 4, the coiled spring 48 yields by compressing and allows the head 42 of the bolt 20 to move towards the first end portion 12 of the clamp body 10. As shown in FIG. 4, the spring 48 is partially compressed and a portion of the head 42 of the bolt 20 extends into the flared portion 19 of the bore 18a extending through the first end portion 12 of the clamp body 10. This prevents further closure of the clamp body and the application of excessive compressive forces on the pole. Rather, the excess compressive force is being accommodated by the resilience of the coiled spring 48.

As noted above, the clamp assembly 2 of FIG. 1 comprises a shim 34 disposed between the second end portion 14 of the clamp body 10 and the cam 30. In this way, the outer surface of the cam 30 bears on the shim 34. As a result, wear occurring through use of the clamp is confined to the shim 34, which is replaceable. The shim 34 is shown in use with a clamp assembly 2 of the present invention. However, the shim 34 finds more general use in known clamps of similar general configuration.

Figure 5:
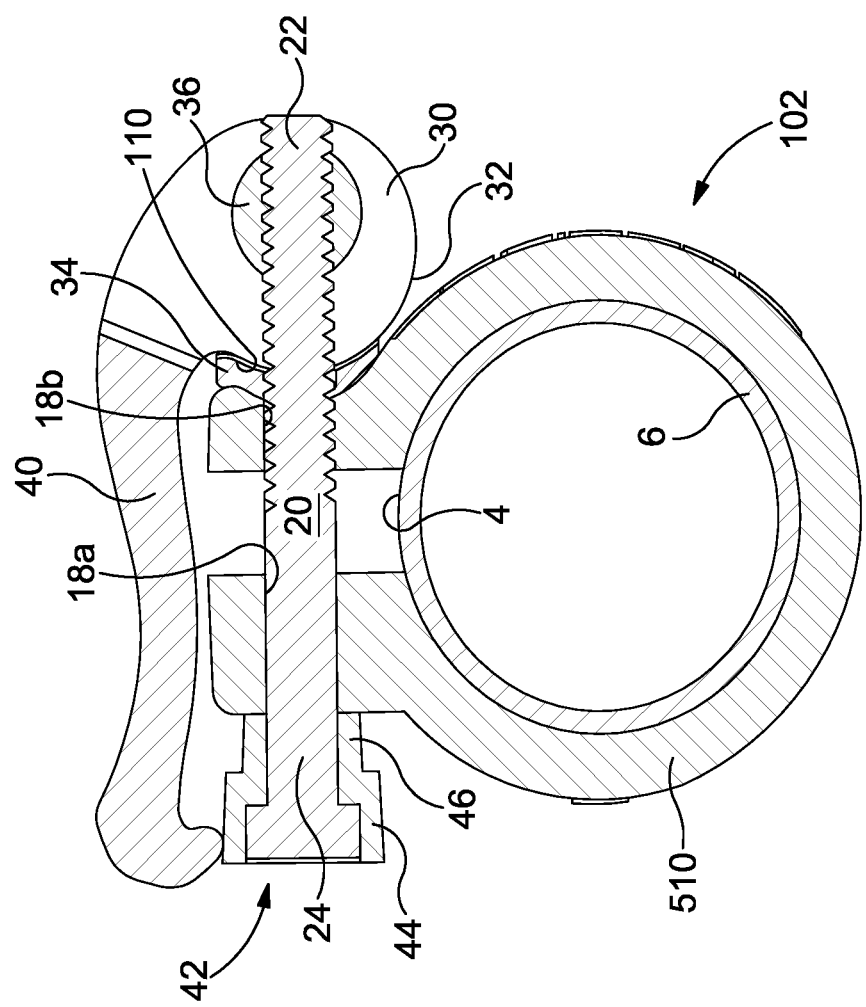
FIG. 5 is a cross sectional view of a clamp assembly according to the second aspect of the present invention.

FIG. 5 shows a cross sectional view of a clamp assembly generally indicated as 102, in the closed position. The clamp assembly 102 has many features in common with the assembly 2 of FIG. 1, which are indicated using the same reference numerals as used in FIGS. 1 to 4 and described above.

Accordingly, as shown, the first end portion 12 and second end portion 14 of the clamp body 510 each comprise a bore 18a, 18b extending therethrough. However, the bore 18a extending through the first end portion 12 of the clamp body 10 is not provided with a flared portion 19 and hence is incapable of accommodating the head 42 of the bolt 20. In addition, the clamp assembly 102 lacks the coiled spring 48 located in the flared portion 19 of the bore 18a.

In FIG. 5, the outer surface 32 of the cam 30 is shown to bear indirectly on the second end portion 14 of the clamp body 510, by way of the protective shim 34. The shim 34 receives the force of the actuator 26 and it is the shim 34 that is subject to wear in use. The shim 34 may be replaced when worn, avoiding the need to replace the entire clamp assembly 102.

The shim 34 is made from a homopolymer acetyl resin, also known under the trade name DELRIN™. The shim 34 has a first arcuate surface 110 shaped so as to compliment the outer surface 32 of the cam 30. In addition, the shim 34 has a second surface formed to compliment the adjacent portion of the second end portion 14 of the clamp body 10. As shown in FIG. 5, the shim 34 has a generally crescent-shaped cross-section. However, it will be appreciated that other shapes may be employed with equal effect.

What is claimed is:

1. A telescoping pole assembly comprising:
    a first hollow pole segment;
    a second hollow pole segment telescoping within the first hollow pole segment;
    a clamp assembly fitting over a first end of the first hollow pole segment for clamping the first and second hollow pole segments together;
    wherein the clamp assembly comprises:
    a clamp body comprising a first end portion and a second end portion;
    a first bore extending through the first end portion of the clamp body and a second bore extending through the second end portion of the clamp body, the first and second bores being generally axially aligned with each other;
    a third bore coaxial with the first bore and of larger diameter than the first bore, the third bore extending only partly into the first end portion of the clamp body and the third bore terminating within the first end portion of the clamp body;
    a shoulder defined by the termination of the third bore within the first end portion of the clamp body;
    a resilient member located within the third bore in the first end portion of the clamp body;
    a connecting bolt extending through the first end portion of the clamp body and the second end portion of the clamp body and having a first end and a second end;
    a head on the first end of the connecting bolt having a first portion with a diameter larger than the third bore and a second portion with a diameter smaller than the third bore but larger than the first bore through the first end portion of the clamp body;
    an actuator attached to the second end of the bolt comprising a cam adjacent the second end portion; and
    wherein movement of the actuator from a first position to a second position causes rotation of the cam to reduce the effective length of the connecting bolt between an outer surface of the cam and the head to move the first and second end portions towards each other and to urge the second portion of the head into the third bore and into engagement with the resilient member to compress the resilient member between the second portion of the head of the connecting bolt and the shoulder in the first end portion of the clamp body.

2. A telescoping pole assembly according to claim 1, wherein the effective length of the connecting bolt can be adjusted by relative rotation between the connecting bolt and the cam.

3. A telescoping pole assembly according to claim 1, wherein the resilient member is a coiled spring.

4. A telescoping pole assembly according to claim 3, wherein the spring rate of the coiled spring is in the range of from 100 to 200 N/mm.

5. A telescoping pole assembly according to claim 1, wherein the cam comprises an eccentric body.

6. A telescoping pole assembly according to claim 5, wherein the ratio between the minimum and maximum radii of the cam is from 1:1.5 to 1:3.5.

7. A telescoping pole assembly according to claim 5, wherein the cam has an outer surface that bears indirectly on the second end portion of the clamp body.

8. A telescoping pole assembly according to claim 7, wherein the outer surface of the cam bears on a shim disposed between the cam and the second end portion of the clamp body.

9. A telescoping pole assembly according to claim 8, wherein the shim has a generally crescent-shaped cross-section.

10. A telescoping pole assembly according to claim 5, wherein the cam is rotatable on an axis which is normal to the central longitudinal axis of the connecting bolt.

11. A telescoping pole assembly according to claim 5, wherein the cam is rotatable about a fastening member attached to the first end of the connecting bolt.

12. A telescoping pole assembly comprising:
a first hollow pole segment;
a second hollow pole segment telescoping within the first hollow pole segment;
a clamp assembly fitting over a first end of the first hollow pole segment for clamping the first and second hollow pole segments together;
wherein the clamp assembly comprises:
- a clamp body adapted to apply a radially compressive force to the outside of a pole, the clamp body comprising a first end portion and a second end portion;
- a first bore extending through the first end portion of the clamp body and a second bore extending through the second end portion of the clamp body, the first and second bores being generally axially aligned with each other;
- a third bore coaxial with the first bore and of larger diameter than the first bore, the third bore extending only partly into the first end portion of the clamp body and the third bore terminating within the first end portion of the clamp body;
- a shoulder defined by the termination of the third bore within the first end portion of the clamp body;
- a resilient member located within the third bore in the first end portion of the clamp body;
- a connecting bolt extending through the first end portion of the clamp body and the second end portion of the clamp body and having a first end and a second end;
- a head on the first end of the connecting bolt having a first portion with a diameter larger than the third bore and a second portion with a diameter smaller than the third bore but larger than the first bore through the first end portion of the clamp body;
- an actuator attached to the second end of the bolt, the actuator comprising an eccentric body which forms a cam adjacent the second end portion; and
- wherein movement of the actuator from a first position to a second position causes rotation of the cam to reduce the effective length of the connecting bolt between an outer surface of the cam and the head to move the first and second end portions towards each other to apply a radially compressive force to the outer surface of a pole, in use, and to urge the second portion of the head into the third bore and into engagement with the resilient member to compress the resilient member between the second portion of the head of the connecting bolt and the shoulder in the first end portion of the clamp body to enable relative movement between the head and the first end portion of the clamp body.

13. A telescoping pole assembly according to claim 12, further comprising a shim disposed between the surface of the second end portion of the clamp body and the actuator.

14. A telescoping pole assembly according to claim 13, wherein the shim has a generally crescent-shaped cross-section.

* * * * *